(12) United States Patent
Alewine et al.

(10) Patent No.: US 6,564,143 B1
(45) Date of Patent: May 13, 2003

(54) METHOD AND APPARATUS FOR PERSONALIZING STATIC AND TEMPORAL LOCATION BASED SERVICES

(75) Inventors: Neal J. Alewine, Lake Worth, FL (US); James Campbell Colson, Austin, TX (US); David Carl Loose, Austin, TX (US); Sandeep Singhal, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,553

(22) Filed: Jan. 29, 1999

(51) Int. Cl.[7] ............................................. G01C 21/26
(52) U.S. Cl. ...................... 701/207; 701/201; 701/209; 701/214; 342/357.01; 342/357.08
(58) Field of Search ................................. 701/200, 201, 701/206, 207, 208, 209, 212, 213, 214; 342/357.01, 357.02, 357.06, 357.08

(56) References Cited

U.S. PATENT DOCUMENTS

| | | | | |
|---|---|---|---|---|
| 4,758,959 A | * | 7/1988 | Thoone et al. | 701/221 |
| 5,485,161 A | * | 1/1996 | Vaughn | 342/357.13 |
| 5,991,690 A | * | 11/1999 | Murphy | 701/211 |
| 6,028,550 A | * | 2/2000 | Froeberg et al. | 342/357.13 |
| 6,049,753 A | * | 4/2000 | Nimura | 701/201 |
| 6,072,421 A | * | 6/2000 | Fukae et al. | 342/42 |

FOREIGN PATENT DOCUMENTS

JP        07-055484        3/1995 ........... G01C/21/00

* cited by examiner

Primary Examiner—Gertrude Arthur
(74) Attorney, Agent, or Firm—Duke W. Yee; Leslie A. VanLeeuwen; Michael R. Nichols

(57) ABSTRACT

A method and apparatus in a vehicle computer system for providing location based services. A path is defined along which the vehicle is to travel. Responsive to receiving a request for a location, the path is used as a filter to identify the location. The position and/or directions of the vehicle also may be used to identify the location.

36 Claims, 6 Drawing Sheets

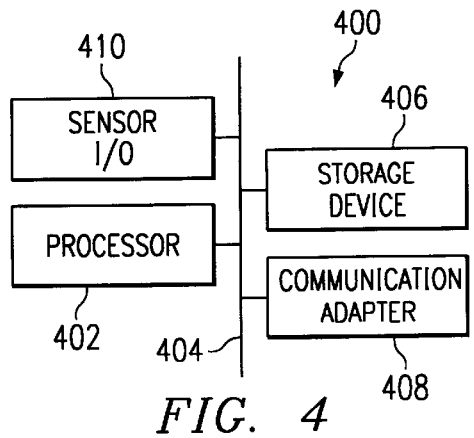
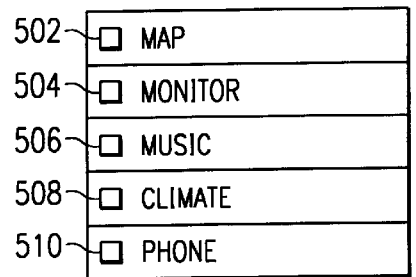
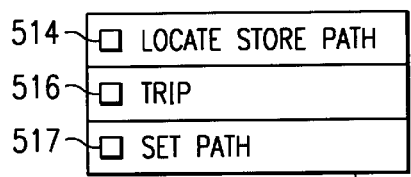
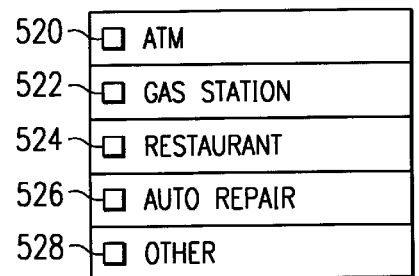
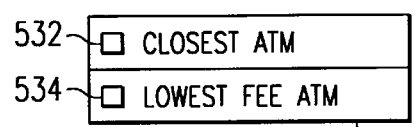
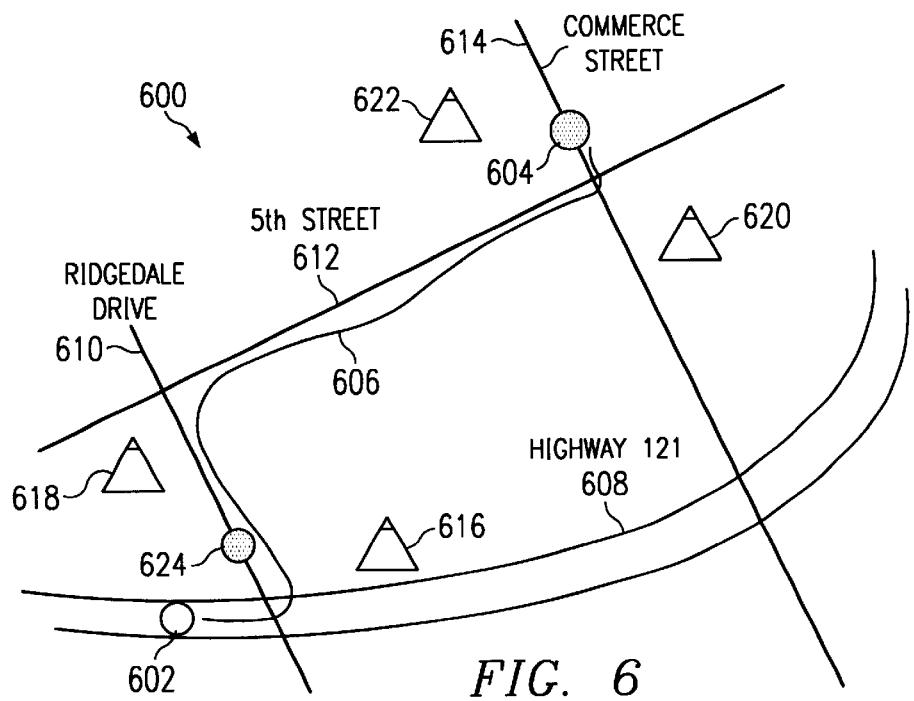

METHOD AND APPARATUS FOR PERSONALIZING STATIC AND TEMPORAL LOCATION BASED SERVICES

BACKGROUND OF THE INVENTION

1. Technical Field

The present invention relates generally to an improved data processing system and in particular to an improved method and apparatus for collecting data in a distributed data processing system. Still more particularly, the present invention relates to a method and apparatus for locating facilities and services.

2. Description of Related Art

The use of computers has become more and more pervasive in society. This pervasiveness includes the integration of personal computers into vehicles. The utilization of computer technology is employed to provide drivers or drivers with a familiar environment. In this manner, a driver's ability to easily use computing resources in an automobile is provided. In addition, it is envisioned that car buyers would be able to use most of the same software elements in an automobile that are used at home or in the office. Furthermore, an automobile owner could completely customize driver information displays to create an optimal environment for the driver's needs. Various platforms have been developed and are being developed for use in automobiles. Many platforms provide the computing strength of a personal computer platform with widely recognized as well as emerging technologies.

Widely accepted technologies that may be implemented within an automobile include, cellular/global system for mobile communications (GSM), global positioning system (GPS), and radio data broadcast (RDB). These devices allow a driver to navigate, receive real-time traffic information and weather forecasts, access databases of personalized information, and place and receive telephone calls, as well as send and receive email and faxes from an automobile. Emerging technologies that are being integrated into computing platforms for automobiles include the universal serial bus (USB) and the digital video disk (DVD).

Another key feature for adapting computer technologies for use in an automobile is a voice recognition interface (VRI) for the driver along with a more conventional graphical user interface (GUI) for passengers. Voice recognition technology is already well developed in multi-media desktop personal computers. For example, VoiceType family products available from International Business Machines Corporation may be also used in the automobile. Voice recognition technology would allow drivers to easily control and interact with onboard computers and telephone applications, including productivity software, internet browsers, and other applications while allowing the driver to keep their hands on the wheel and their eyes on the road. Such productivity is especially important when some surveys show that up to twelve percent of a person's waking life is spent in an automobile.

Computing systems are currently being developed for automobiles to guide drivers from various points using GPS data, traffic data, weather data, and other information. In addition, computing systems for automobiles are being developed with maps containing locations of various facilities, such as automatic teller machines (ATMs), restaurants, hotels, and points of interest. These systems are being developed such that the driver may locate these facilities and directions to the facilities from within the automobile through an automotive computing platform.

These systems are based on the current location of the vehicle and do not take into account localized preferences of a driver. A driver traveling to work or to the store is not interested in all of the information available. The driver is generally concerned only with information relating to the particular trip being made by the driver.

Therefore, it would be advantageous to have an improved method and apparatus for locating facilities through an automotive computing platform.

SUMMARY OF THE INVENTION

The present invention provides a method and apparatus in a vehicle computer system for providing location based services. A path is defined along which the vehicle is to travel. Responsive to receiving a request for a location, the path is used as a filter to identify the location. The position and/or directions of the vehicle also may be used to identify the location.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram of a data processing system within a facility in accordance with a preferred embodiment of the present invention;

FIGS. 5A–5D are diagrams of displays of menus used to locate facilities in accordance with a preferred embodiment of the present invention;

FIG. 6 is a diagram of a map displayed on a display device in accordance with a preferred embodiment of the present invention;

DETAILED DESCRIPTION OF THE PREFERRED EMBODIMENT

Figure 1:
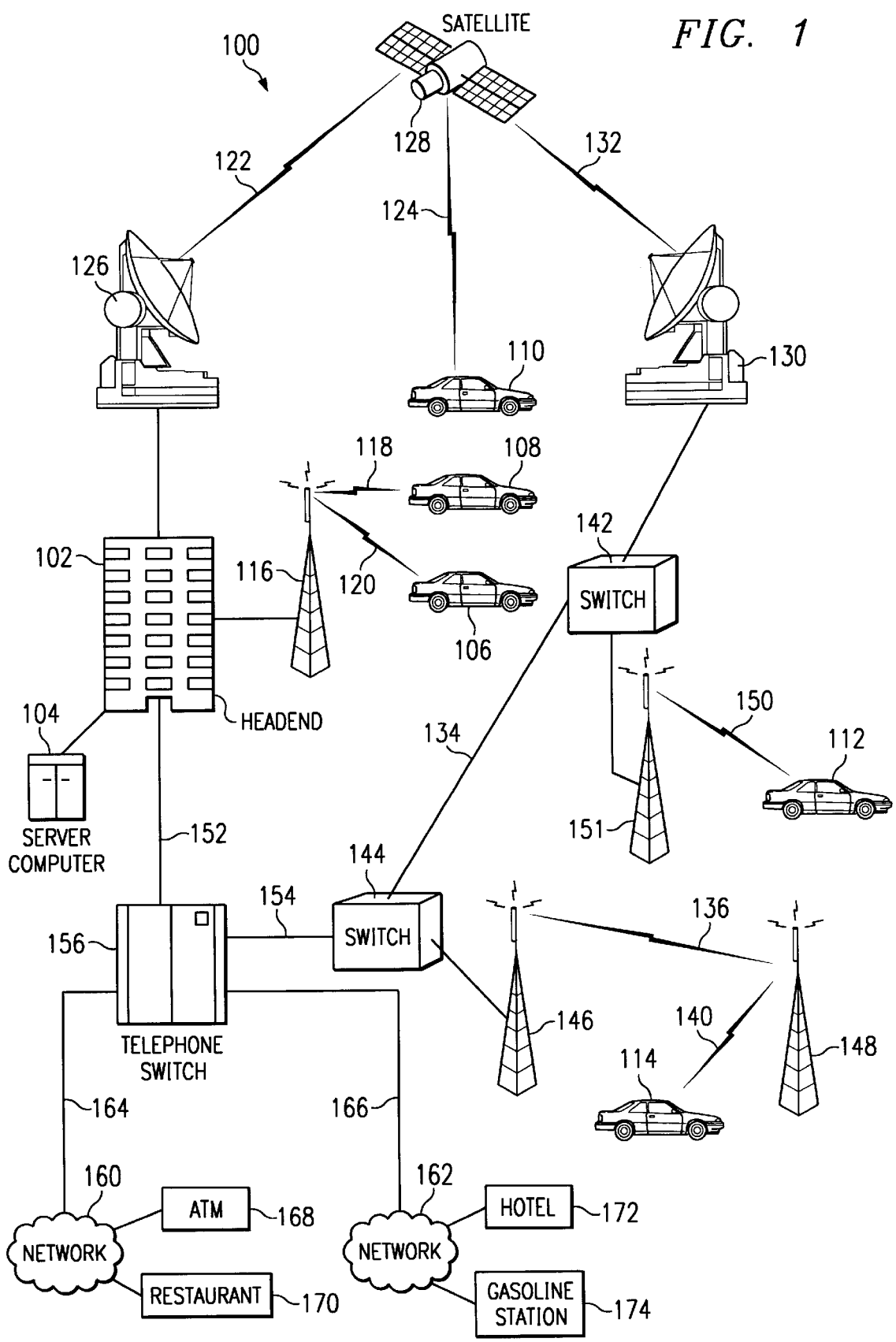
FIG. 1 is a diagram of a computing system in accordance with a preferred embodiment of the present invention.

With reference now to the figures and in particular with reference to FIG. 1, a diagram of a computing system 100 is depicted in accordance with a preferred embodiment of the present invention. In this example, head-end 102 is connected to a server computer 104, which is employed to collect data from various automotive computing platforms that may be present within computing system 100. In particular, server computer 104 may communicate with various mobile units 106–114, which are automobiles in the depicted example. These automobiles each contain a computing platform, which may communicate with server 104. In this example, communications between various mobile units may be accomplished through a cellular phone system, an iridium satellite phone system or other wireless systems.

Communication between server computer 104 and mobile units 106–114 is accomplished in a number of different ways in this example. For example, radio tower 116 provides communications links 118 and 120 to mobile units 108 and 106 respectively. Communications links 118 and 120 are radio frequency communications links generated between radio tower 116 and antennas located at mobile units 106 and 108. In addition, server 104 may communicate with mobile unit 110 through communications links 122 and 124. Communications link 122 is established between satellite dish 126 and satellite switch 128 with communications link 124 being established between satellite 128 and mobile unit 110. Communications links 122 and 124 are radio frequency based links generated by signals sent to satellite switch 128 from satellite dish 126 and from satellite switch 128 to mobile unit 110. In this example, radio tower 116 and satellite dish 126 are connected to head-end 102 and provide for transmissions originating from or passing through head-end 102.

Further, signals may be sent from satellite switch 128 to satellite dish 130 via communications link 132. From satellite dish 130, information may be sent to mobile unit 114 through communications links 134, 136, and 140. Communications link 134 in this example is a link between switch 142 and switch 144. In this manner, a path may be established from server computer 104 to mobile unit 114 to create a path containing communications links 122, 132, 134, 136, and 140. Communications link 134 is a physical link, which may be for example, coaxial cable, fiber optic cable, or a combination of the two. Each switch also has a "link", also called a "path" within the switch for writing data through the switch. An "input link" is the input or source portion of the link associated with the input into the switch, and an "output link" is the output or destination portion of the link associated with the output from the switch. Communications link 136 is established between radio towers 146 and 148. Radio tower 146 is connected to switch 144 in FIG. 1. Communications link 140 is established between radio tower 148 and mobile unit 114. Communications with mobile unit 112 may be established through a path containing communications links 122, 132, and 150. Communications link 150 is established between radio tower 151 and mobile unit 112. In this example, satellite dish 130 and radio tower 151 are connected to witch 142.

In addition, server computer 104 may use an alternate path to communicate with mobile unit 114. For example, a path through communications links 152, 154, 136, and 140 may be employed to communicate with mobile unit 114. Communications links 152 and 154 are physical links in this example. Communications link 152 is established between head-end 102 and switch 156, while communications link 154 is established between switch 156 and switch 144. In this manner, data signals, such as multi-media data, which may include video, graphics, voice, and text may be sent between server computer 104 and mobile units 106–114. These data signals may also include information about traffic conditions, such as the amount of traffic, weather, accidents, construction, and other conditions affecting the movement of traffic.

In addition, computing system 100 also includes networks 160 and 162, which are in communication with server computer 104. Network 160 has a communications path to server computer 104 via communications links 164 and 152. Network 162 communicates with server computer 104 through communications links 166 and 152. Various facilities may be within networks 160 and 162. For example, in FIG. 1, automatic teller machine (ATM) 168 and restaurant 170 are located within network 160, while Hotel 172 and gasoline station 174 are located within network 162. Of course, other facilities not shown may be located within networks 160 or 162. Information is obtained from ATM 168, restaurant 170, hotel 172, gasoline station 174 and sent to server computer 104. This information may include an indication of whether cash is present within an ATM, what cards are currently being accepted by the ATM, and whether the ATM is operating. With respect to a facility, such as a gasoline station, the information may include the hours that the gasoline station is open, the type of gasoline that is currently available, and the price of the currently available gasoline. Server 104 may poll networks 160 and 162 to obtain this information or the information may be pushed to server 104 from the networks. An arrangement with various banks owning the ATM machines may be present to allow for a query of ATMs on a regular basis to determine whether a given ATM is operating correctly and contains cash. With other facilities, such as, restaurant 170, hotel 172, gasoline station 174, other information may be polled for depending on the criteria for the particular facility.

Figure 2:
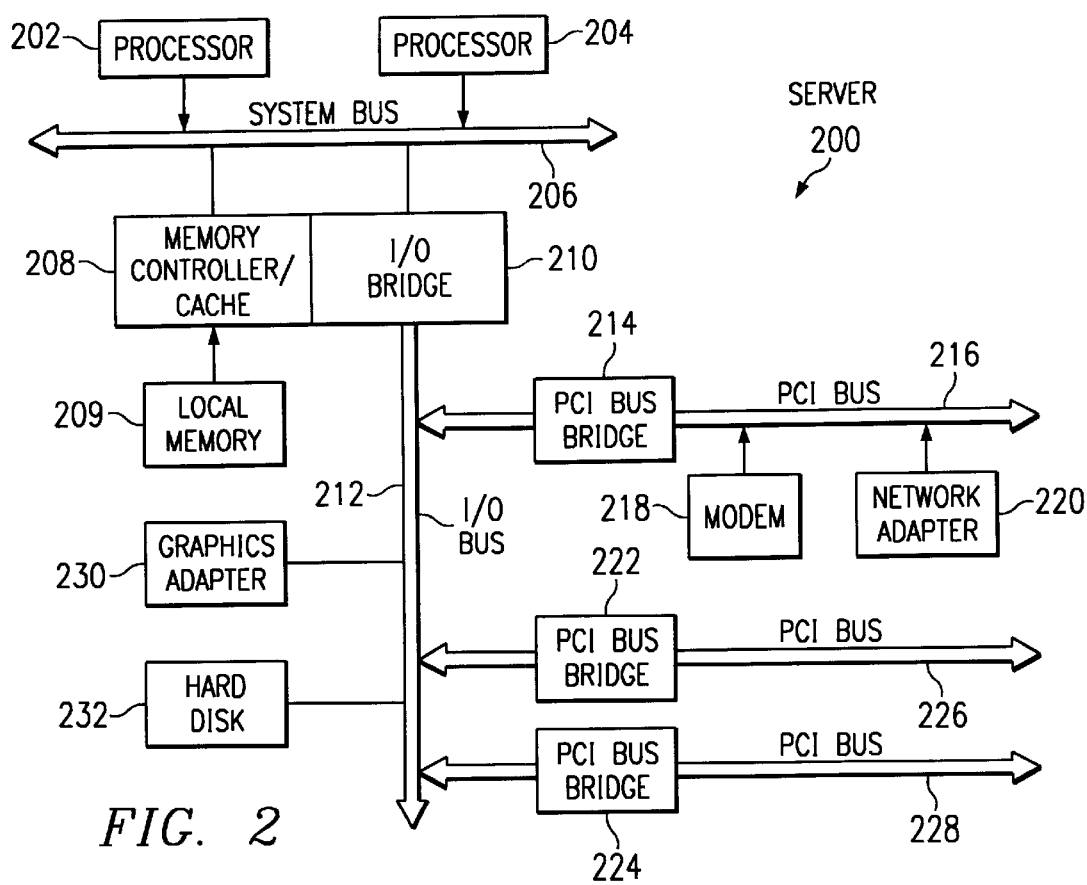
FIG. 2 is a block diagram of a data processing system, which may be implemented as a server, in accordance with a preferred embodiment of the present invention.

Referring to FIG. 2, a block diagram depicts a data processing system, which may be implemented as a server, such as server computer 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to various mobile units illustrated in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as an optical disk drive and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
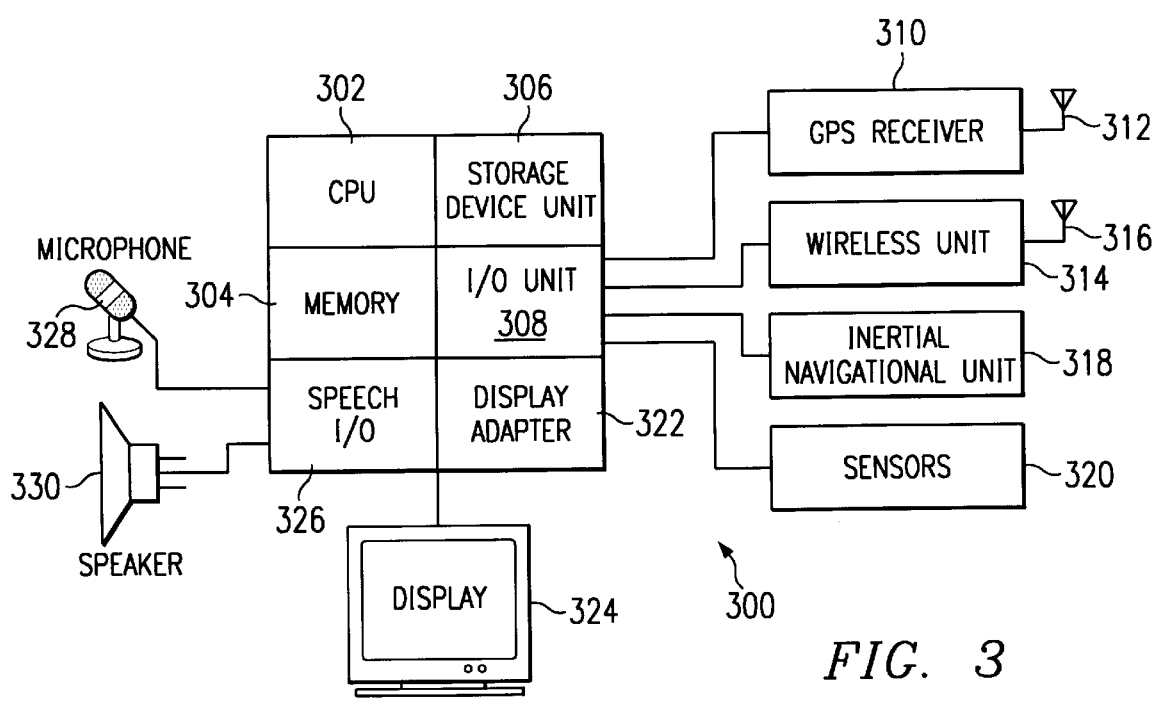
FIG. 3 is a block diagram of an automotive computing platform in accordance with a preferred embodiment of the present invention.

Turning next to FIG. 3, a block diagram of an automotive computing platform is depicted in accordance with a preferred embodiment of the present invention. Computing platform 300 is located within a vehicle, such as an automobile or truck. Computing platform 300 includes a CPU 302, which may be an embedded processor or processor such as a Pentium processor from Intel Corporation. "Pentium" is a trademark of Intel Corporation. Computing platform 300 also includes memory 304, which may take the form of random access memory (RAM) and/or read only memory (ROM).

Computing platform 300 also contains a storage device unit 306. Storage device unit 306 may contain one or more storage devices, such as, for example, a hard disk drive, a flash memory, a DVD drive, or a floppy disk. Automotive computing platform 300 also includes an input/output (I/O) unit 308, which provides connections to various I/O devices. In this example, a GPS receiver 310 is included within automotive computing system 300 and receives signals through antenna 312. Wireless unit 314 provides for two-way communications between computing unit 300 and another data processing system, such as server 104 in FIG. 1. Wireless unit 314 may be for example a cellular unit, a personal communications system unit, or a satellite phone unit. Communications are provided through antenna 316. In addition, inertial navigation unit 318 is connected to I/O unit 308. Inertial navigation unit 318 is employed for navigation when GPS receiver 310 is unable to receive a usable signal or is inoperable.

A multitude of different sensors 320 also are connected to I/O unit 308. These sensors may include, sensors that detect speed, unusually high acceleration forces, airbag deployment, extensive speed up and slow down cycles, dropping out of cruise control, brake use, anti-lock brake occurrences, traction control use, windshield wiper use, turning on or off of lights for the automobile, and outside light levels. In addition, sensors 320 may include sensors for detecting steering wheel movement, temperature, the state of door locks, and the state of windows. In other words, almost any condition or parameter about or around an automobile may be detected through the use of sensors 320.

Computing unit 300 also includes a display adapter 322, which is connected to display 324. In the depicted example, this display is a touch screen display. Alternatively or in addition to a touch screen display, display 324 also may employ a heads-up display projected onto the windshield of the automobile. Maps and other information may be displayed by display 324. Further other information, such as information about systems in the vehicle may be presented using display 324.

Computing unit 300 also includes a microphone 328 and a speaker 330 to provide a driver with an ability to enter commands and receive responses through speech I/O 326 without having to divert the driver's attention away from the road, or without the driver having to remove the driver's hands from the steering wheel.

A driver may log in to computing platform 300 such that various preferences for a particular driver may be retrieved. The log in may be achieved through a number of different mechanisms. For example, a driver may log in through recognition of a particular driver's voice or through entering a password and ID. This preference information is stored in storage device unit 306 in the depicted example. Additional preferences may be transmitted to a server, such as server 104 in FIG. 1 to aid in processing requests from a particular driver.

With reference now to FIG. 4, a block diagram of a data processing system within a facility is depicted in accordance with a preferred embodiment of the present invention. Data processing system 400 is an example of a data processing system that may be used within a facility, such as, for example, an ATM, restaurant, hotel, gasoline station, or rest stop. In this example, processor 402 is connected to bus 404 and includes storage device 406, which may be used to contain various information.

For an ATM, storage device 406 may identify the amount of cash available and various cards accepted by the ATM machine. Communications adapter 408 is used to receive and send information between the facility and another entity. In the case of an ATM machine, communications adapter 408 may provide communication between the ATM and the data processing system for the bank owning the ATM. Sensor I/O 410 may be used to identify various changes with respect to the facility. For example, with an ATM, sensor I/O 410 may be used to identify the withdrawal of cash and to identify ATM cards being inserted within the ATM machine.

The diagram in FIG. 4 is not meant to indicate any architectural limitations on a data processing system that may be used within a facility. Depending on the implementation, a data processing system used within a facility may include fewer or additional components than those shown in FIG. 4. In addition, although data processing system 400 has been explained in the context of an ATM machine, such a data processing system may be used with respect to other facilities.

For example, if the facility of interest is a hotel, data processing system 400 may be a terminal or computer located at the hotel in which the terminal or computer communicates with a network belonging to the company owning the hotel. In such a case, sensor I/O 410 may not be necessary and a keyboard for input would be used to identify persons checking in and out, and room availability.

The present invention recognizes that drivers are often interested in localized information relating to a particular path or route known to the driver. If the driver is traveling to the store the driver is interested in the gasoline stations, traffic conditions, and other services located along the path or route to the store. If the driver is traveling a longer distance, such as from a city in one state to a city in another state, the driver may be interested in services and facilities that reside along the path between the cities.

The present invention provides a method, apparatus, and instructions for identifying locations of various features along a path that has been defined by a driver. A path, also referred to as a route, is defined or selected by the driver. Based on the selection, a number of data points are recorded to identify the path. These data points are typically from either a global positioning system (GPS) or a combination of a GPS with a dead reckoning system based on speedometer information or other positioning system. The data input from these systems are used to track a defined path. If a navigation system is present or accessible, the information may be refined based on map data to correct location inaccuracies that may exist and to identify roads actually being used.

Once the information has been recorded, this information may be used on subsequent trips as a filter for various features. For example, if a driver is driving home from work, the driver may indicate or select a defined path to receive alerts about features, such as a traffic jam or a section of construction on the path.

With reference now to FIGS. 5A–5D, diagrams of displays of menus used to locate facilities are depicted in accordance with a preferred embodiment of the present invention. In this example, the displays illustrated in FIGS. 5A–5D are those that may be displayed on display 324 in computing platform 300 in FIG. 3.

In FIG. 5A, display 500 includes a map button 502, a monitor button 504, a music button 506, a climate button 508, and a phone button 510. These buttons may be selected by the driver to activate various functions within the computing platform. In the depicted example, these buttons may be selected by touching the appropriate button on display 500. Alternatively, voice recognition software may be used to recognize commands for the various selections. In this example, selection of monitor button 504 provides a display of various systems within the automobile that the driver may view to obtain status information, such as temperature, oil levels, whether doors are open, and failed devices. Music button 506 allows a driver to manipulate the stereo system of the car. Climate button 508 allows the driver to adjust various climate controls. Phone button 510 allows the driver to initiate a call via the display. Selection of map button 502 results in display 512 in FIG. 5B being displayed to the driver. Display 512 includes locate store path button 514, trip button 516, and set path button 517. Selection of trip button 516 allows the driver to map and obtain directions for various trips by selecting an origination point and a destination point.

Selection of set path button 517 allows the driver to set one or more paths or routes by selecting an origination point and a destination point. The origination and destination points may be the same, which results in a path that is a loop. The path set by the driver is used as a filter in locating various facilities on or close to the path or route. How close the facility must be to the path to be considered can be a default setting or set by the driver. The driver may require the facility to be on the path or allow a several block or several mile variance depending on the path set by the driver. Different tolerances or thresholds for how close a facility must be to the path may be set for all or for individual facility types.

The path may be set by the driver in a number of ways. For example, the driver may select an origination and a destination point on a map or the driver may indicate the origination and destination points while driving the actual path.

Selection of locate store path button 514 results in display 518 in FIG. 5C being displayed to the driver. This display includes various selections, such as ATM button 520, gasoline station button 522, restaurant button 524, auto repair button 526, and other button 528. Selection of gasoline station button 522 would result in the system querying for the closest gasoline station to the present location of the driver of the vehicle. In addition, the query would be made by obtaining data from a server, such as server computer 104 in FIG. 1, to obtain current information as to what gasoline stations are currently open or closed along or close to the path set by the driver. Further, a driver may obtain information as to whether a gasoline station currently has the type of gasoline that the driver prefers to use with the automobile. For example, one driver may only desire to place premium gasoline in the automobile. As a result, such a preference would result in gasoline stations located along or close to the path being located that presently have this grade of gasoline available. In addition, a driver may prefer to locate a gasoline station from one company because the driver has a credit card with that company.

Selection of restaurant button 524 allows a driver to locate various restaurants that are located along or close to the path set by the driver. Through the selection of this button, the driver may locate restaurants of various types and price ranges. In addition, the driver may locate restaurants that are open or have seating availability. This selection uses the path as a filter to identify facilities that are close or on the path set by the driver. Similar information may be obtained by selecting auto repair button 526. If other button 528 is selected, the driver may select another facility by inputting the name of the facility. Additionally, a driver may identify grocery stores or convenient stores that are close by or that have certain goods or items available for purchase.

Selection of ATM button 520 results in the closest ATM being selected that is along or close to the path set by the driver. These selection also may take into account the direction that the vehicle is moving along the path to select facilities ahead of the vehicle rather than behind the vehicle to avoid requiring the driver to turn around to reach the vehicle. Further, the side of the street on which the facility is located with respect to the vehicle location and direction of travel also may be used as a factor in located a facility along or near the path.

Although only a single locate selection for a path is shown, other paths may be set and displayed within display 512 for selection by the driver. For example, the driver may have set a path for work or for a weekly trip to another city. These paths also could be displayed within display 512. Also, other types of icons other than a button could be used to display selection to the driver. For example, an icon representing an ATM machine could be used in place of ATM button 518, and an icon of a store could be used in place of locate store path button 512.

In the depicted example, a single path was displayed as locate store path button 512. Depending on the driver who identifies themselves to the computing system, different selections for paths may be presented to the driver on the display. Identification of the driver is obvious to one of ordinary skill in the art. This identification may be made through various known mechanisms such as, for example, a login ID, a password, a smart card or through voice recognition.

With reference now to FIG. 6, a diagram of a map displayed on a display device, such as display 324 in computing platform 300 in FIG. 3, is depicted in accordance with a preferred embodiment of the present invention.

Map 600 is displayed to the driver in response to locating a facility selected by the driver. Map 600 includes an origination point 602 and a destination point 604, which define the two ends of path 606. A number of different route elements make up and are associated with path 606. Route elements include, for example, road names, turns, bridges, roads, and highways. In this example, elements associated with path 606 include highway 121 608, Ridgedale Drive 610, 5$^{th}$ Street 612, and Commerce Street 614. Also illustrated on map 600 are features that are associated with path 606. Features are basically facilities or conditions that may be of interest to the driver. These features may include, for example, a gasoline station, a restaurant, a traffic jam, and a construction area. In this example, the features illustrated in map 600 are facilities 616–622. These facilities may be, for example, an ATM machine, a gasoline station, a restaurant, or a hotel.

When a driver requests a certain type of facility, the facilities on or close to path 606 will be displayed to the driver. In this example, facilities 616–622 have been displayed to the driver. Alternatively, instead of displaying all available facilities, only facilities meeting a drivers preferences might be displayed. For example, if the requested facility is a restaurant, only restaurants currently open and having available seating might be displayed. If the facility is a gasoline station, only those gasoline stations on the path or close to the path having the type of gasoline used by the driver would be displayed. In addition, if the vehicle includes a navigation system, such as a GPS navigation system, then the location of the driver may be taken into account in displaying facilities on map 600. For example, if the driver at point 624 for path 606 has requested the location of a restaurant, and assuming that facilities 616–622 are all available restaurants, only facilities 618–622 would be displayed because these facilities are ahead of the vehicle, which is located at point 624. In this instance, facility 616 would not be displayed on map 600 because the driver has already passed this facility. Such a feature would avoid requiring the driver to turn around to reach a facility that has already been passed. Other factors that may be used in displaying facilities to a driver may include, for example, the side of the road that the facility is located on with respect to the vehicle in addition to whether the facility is ahead of the vehicle.

Although in the depicted example path 606 is a path with a different origination and destination, path 606 could have the same origination and destination such that the path is in essence a loop.

Figure 7:
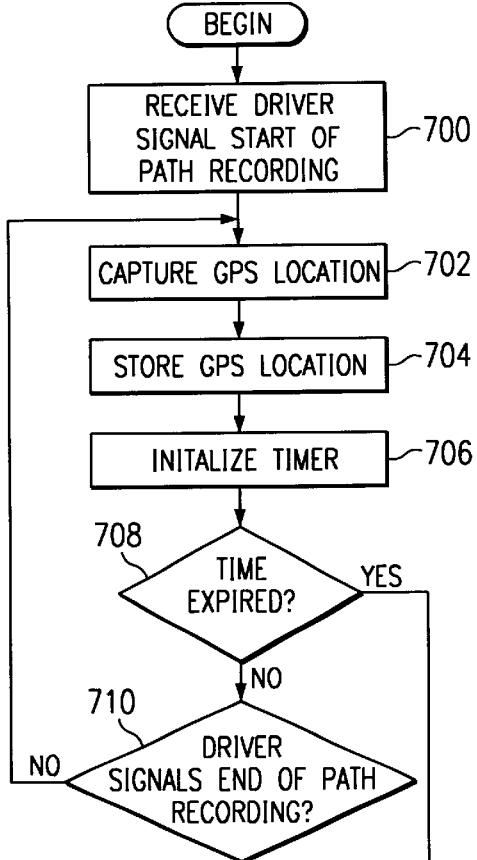
FIG. 7 is a flowchart of a process for recording a path using a global positioning system in accordance with a preferred embodiment of the present invention.

With reference next to FIG. 7, a flowchart of a process for recording a path using a global positioning system is depicted in accordance with a preferred embodiment of the present invention. This process is used to define a path for later use in presenting information about features on or along the path to a driver. This path is recorded while the driver is actually traveling on the path that the driver desires to define. This process is implemented in a computing platform in a vehicle, such as computing platform 300 in FIG. 3.

The process begins by receiving a signal indicating the start of path recording (step 700). Next, the GPS location is captured (step 702) this location is then stored (step 704). A timer is then initialized (step 706). This time is used to periodically capture and store GPS locations to create data points for the path being defined by the driver. A determination is then made as to whether the timer has expired (step 708). If the timer has expired, the process terminates. If the timer has not expired, a determination is made as to whether the driver has indicated that the path recording should terminate (step 710). If the driver has not indicated that the recording should terminate, the process returns to step 702. Otherwise, the process terminates.

Figure 8:
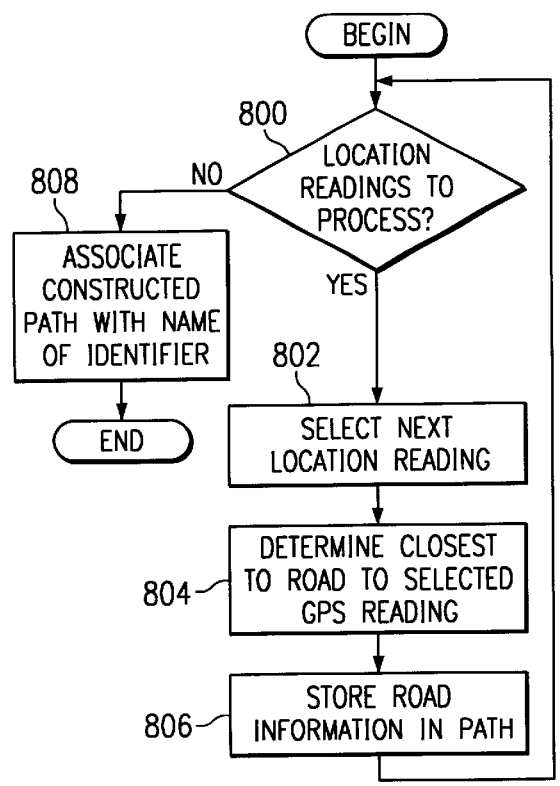
FIG. 8 is a process for mapping data points to route elements in accordance with a preferred embodiment of the present invention.

With this information, the route elements may be associated with the data gathered by the process in FIG. 8. With reference now to FIG. 8, a process for mapping data points to route elements in accordance with a preferred embodiment of the present invention. This process also may be implemented in a computing platform in a vehicle. The process begins by determining whether location readings are present for processing (step 800). These reading are data points that may either be obtained from GPS readings in the process in FIG. 7. Alternatively, the readings may be interpolated points between GPS readings. If additional readings are present, the process selects the next location reading (step 802). This reading is used to identify the road closest to the selected GPS reading (step 804). This information is then stored in association with a path or route (step 806) with the process then returning to step 800.

If additional location readings are not present for processing in step 800, the constructed path is then associated with a name or identifier (step 808) with the process terminating thereafter. This name or identifier may be, for example, in the form of text, an icon, or text and an icon.

Figure 9:
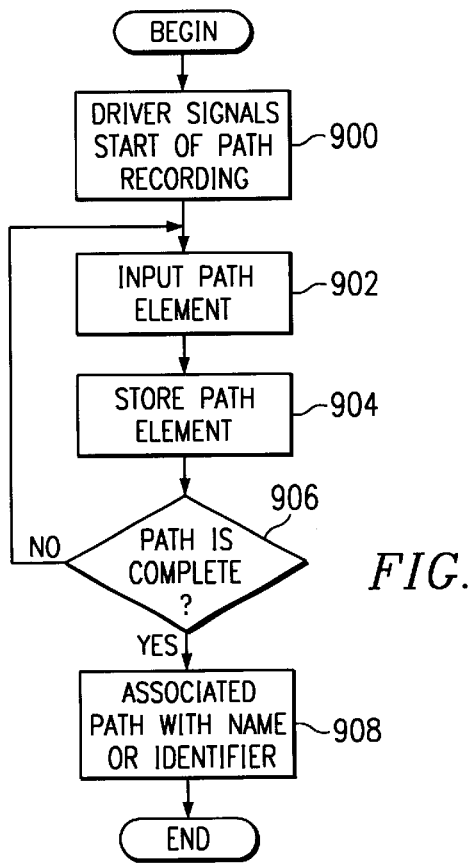
FIG. 9 is a flowchart of a process used to manually record path or route elements in accordance with a preferred embodiment of the present invention.

With reference now to FIG. 9, a flowchart of a process used to manually record path or route elements is depicted in accordance with a preferred embodiment of the present invention. The process begins by receiving an indication to start recording of the path (step 900). A path element is input by the driver (step 902). This path element is then stored (step 904) a determination is then made as to whether the path has been completed (step 906). If the path has not been completed, the process returns to step 902. Otherwise, the path is then associated with a name or identifier (step 908) with the process terminating thereafter.

Figure 10:
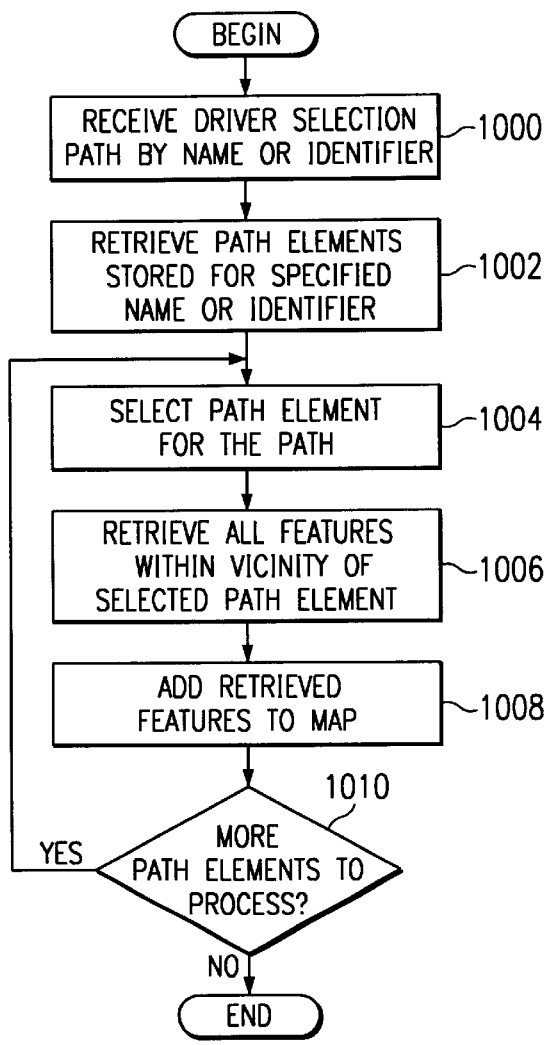
FIG. 10 is a flowchart of a process for associating a path with feature information in accordance with a preferred embodiment of the present invention.

With reference now to FIG. 10, a flowchart of a process for associating a path with feature information is depicted in accordance with a preferred embodiment of the present invention. The process begins by receiving a driver selection of a path by a name or identifier (step 1000). The path elements are then retrieved for the specified name or identifier (step 1002). A path element for the path is selected (step 1004). The path elements are stored in an order corresponding to the path. This step selects the first path element that has not been processed. All features on or within a selected distance of the selected path element are retrieved (step 1006). Step 1006 may optionally be delayed until the driver manually indicates that the path element should be processed or when the GPS system correlates the path element.

The retrieved features are then added to the map (step 1008). As mentioned before, these features include a number of items, such as, for example, gasoline stations, restaurants, traffic information, and construction information. A determination is then made as to whether more path elements are present for processing (step 1010). If additional elements are present for processing, the process returns to step 1004. Otherwise the process terminates.

The process described in FIG. 10 may retrieve feature information from one or more sources. For example, feature information about gasoline stations and restaurants may be retrieved from a database located within the vehicle while traffic and construction feature information may be retrieved from a remote server via a wireless communications link to the computing platform in the vehicle. Alternatively, all of the information may be retrieved from the database in the vehicle or from the server.

In another embodiment, rather than displaying all features on the map to the driver, features selected by the driver may be displayed to avoid cluttering the map.

Figure 11:
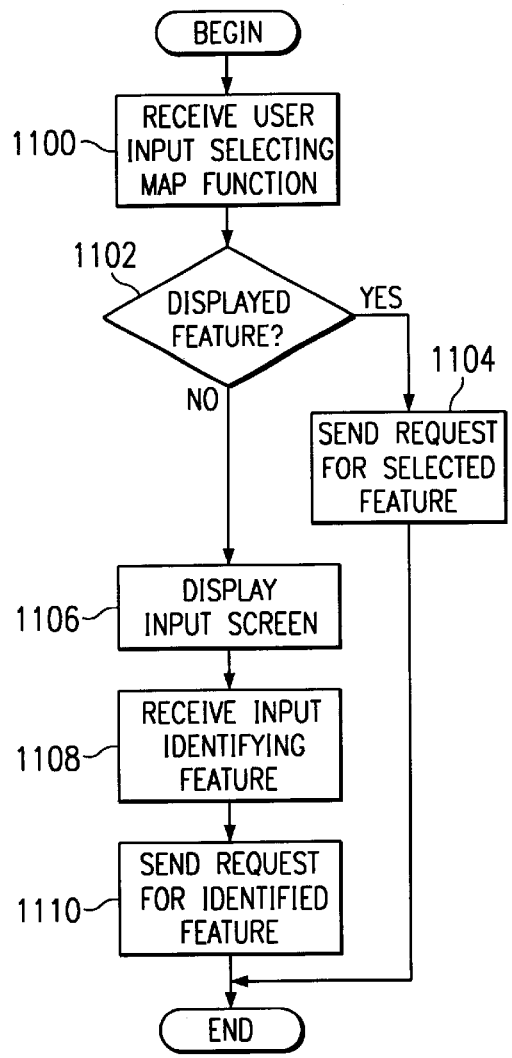
FIG. 11 is a flowchart of a process used in a computing platform located in a vehicle in accordance with a preferred embodiment of the present invention.

With reference now to FIG. 11, a flowchart of a process used in a computing platform located in a vehicle is depicted in accordance with a preferred embodiment of the present invention. The process in FIG. 11 is used to locate a feature selected by a driver. The process begins by receiving driver input selecting a map function (step 1100). Thereafter, a determination is made as to whether the input is for a displayed feature (step 1102). If the selection is for a displayed feature, then the request for the selected feature is sent from the automotive computing platform to a server computer (step 1104) with the process terminating thereafter.

If, on the other hand, the driver has not selected a display feature, the driver has selected another selection resulting in a display being displayed to the driver to input the feature the driver desires to locate (step 1106). This display is used when the displayed screen providing selections of facilities does not show the one desired by the driver. Thereafter, input is received identifying the feature (step 1108) and the request for the identified feature is then sent to the server computer (step 1110), with the process terminating thereafter.

Figure 12:
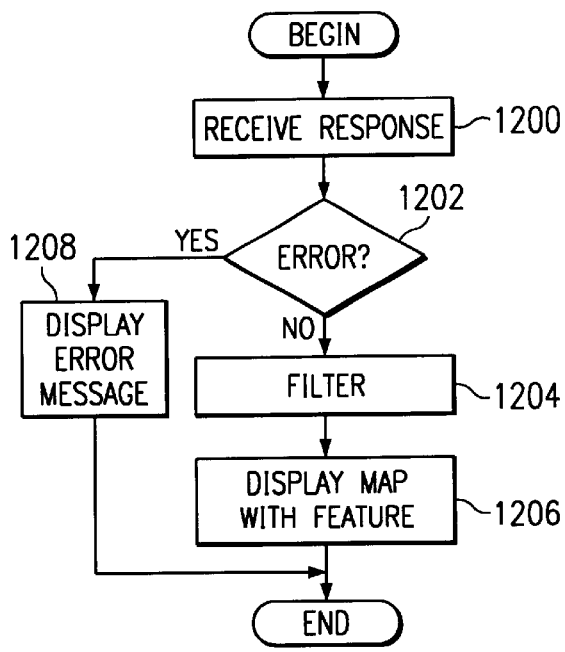
FIG. 12 is a flowchart of a process employed within a computing system to present a located feature in accordance with a preferred embodiment of the present invention.

Referring now to FIG. 12, a flowchart of a process employed within a computing system to present a located feature is depicted in accordance with a preferred embodiment of the present invention. The process begins by receiving a response from the server computer (step 1200). A determination is made as to whether the response is an error (step 1202). If an error has not occurred, then the information is optionally filtered (step 1204). This filtering step may be used to filter the information based on the location of the vehicle and/or the direction in which the vehicle is travelling. For example, a facility, such as a gasoline station, that has been passed by the vehicle will not be displayed if another facility meeting the request is located ahead of the vehicle. A similar filtering would occur with a feature in the form of a traffic jam. Then the feature returned in the response is displayed on a map with the path or route (step 1206) with the process terminating thereafter. More than one feature meeting the request could be returned and displayed in step 1204. With reference again to step 1202, if an error has occurred, then an error message is displayed to the driver (step 1208) with the process terminating thereafter.

Figure 13:
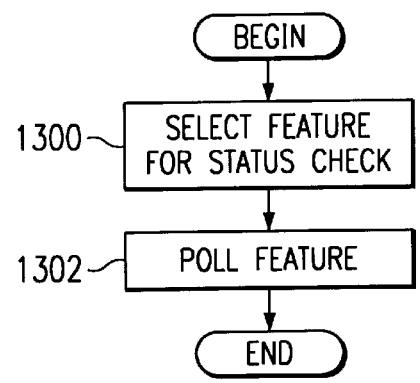
FIG. 13 is a flowchart of a process used by a server computer to collect information on features in accordance with a preferred embodiment of the present invention.

With reference now to FIG. 13, a flowchart of a process used by a server computer to collect information on features is depicted in accordance with a preferred embodiment of the present invention. The process begins by selecting the features for status check (step 1300). Thereafter, the selected features are polled (step 1302) with the process terminating thereafter. The polling may be accomplished by the server computer sending a request to each feature selected or to another computer collecting information on the status of the features. For example, if the feature is a traffic jam, the collection of the information may be from a traffic control facility or from drivers in the area of the traffic jam. When the feature is a facility such as an ATM machine, the polling may be accomplished by sending a request to the ATM machine itself.

Figure 14:
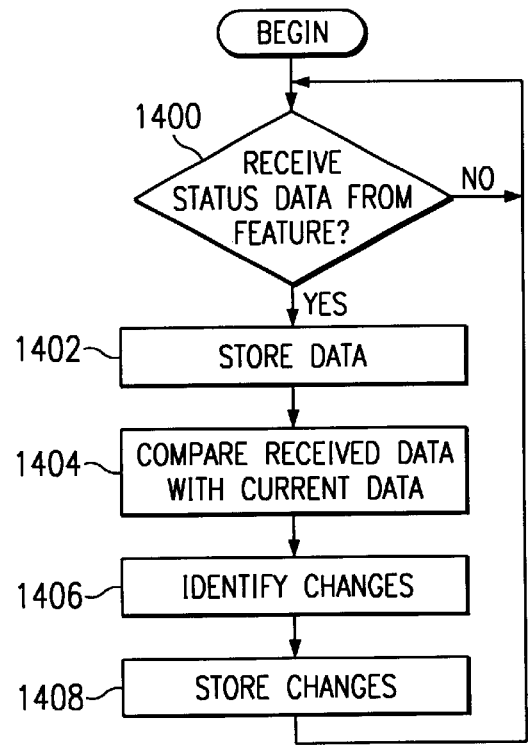
FIG. 14 is a flowchart of a process for processing status information from various features in accordance with a preferred embodiment of the present invention.

With reference next to FIG. 14, a flowchart of a process for processing status information from various features is depicted in accordance with a preferred embodiment of the present invention. This information is typically received in response to polling of features as described with reference to FIG. 13. The process determines whether status data or information has been received from the features (step 1400). If status information has not been received from a feature, the process returns to step 1400. Upon receiving status information or data from a feature, this information is stored (step 1402). Thereafter, the information received from the feature is compared with current data regarding the feature (step 1404). Any changes between the received data and the current data are identified (step 1406). These changes are stored to update the current data (step 1408), with the process then returning to step 1400 to monitor for additional data from features. The status data for a feature, such as a construction site may be data indicating whether construction is occurring and whether one or more lanes have been removed from normal use for the construction. If the feature is a facility, such as a restaurant, the status data may include whether the restaurant is open and whether seating is available.

Figure 15:
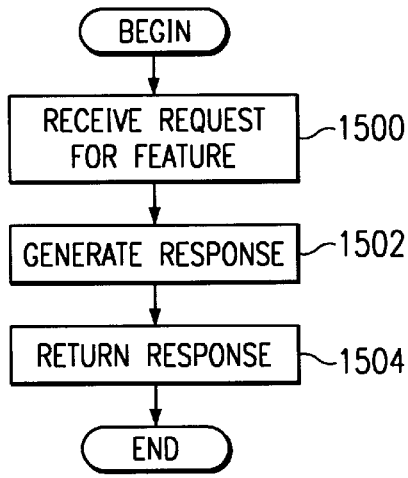
FIG. 15 is a flowchart of a process for processing a request to locate a feature in accordance with a preferred embodiment of the present invention.

With reference now to FIG. 15, a flowchart of a process for processing a request to locate a feature is depicted in accordance with a preferred embodiment of the present invention. This process is typically implemented in a server, such as server computer 104 in FIG. 1. The process begins by receiving a request for a feature (step 1500). A response to the request for the feature is generated (step 1502). The response is generated from information stored by the server. This information includes updates, such as those received by the process as described in FIG. 14. This response is then returned (step 1504) with the process terminating thereafter. The response may be in the form of an error message or a location of the requested feature.

Thus the present invention provides a mechanism for defining a path and filtering information about features along the path. Further, these paths may be sent to a server and stored for dissemination or use by drivers in other vehicles.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. In the depicted example, the path is defined using a GPS system with the vehicle traveling along the path. Further, the path may be defined by selecting an origination and destination using presently available navigation systems with the path being used to filter information about features that the driver may wish to locate. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a vehicle computer system in a vehicle, comprising data processing system implemented steps of:
   defining a path along which the vehicle is to travel; and
   responsive to receiving a request for a location other than a current position of the vehicle, using the path as a filter to identify the location.

2. The method of claim 1, wherein the path is used to filter information in a database located within the vehicle computer system.

3. The method of claim 1, wherein the path is used to filter information in a remotely located server computer.

4. The method of claim 1 further comprising:
presenting the location in response to using the path as a filter to identify the location.

5. The method of claim 4, wherein the presenting step includes displaying the location on a map.

6. The method of claim 4, wherein the presenting step includes displaying the location on a map relative to the path.

7. A method in a data processing system located in a vehicle for providing location information, the method comprising data processing system implemented steps of:
receiving a request for location information other than a current position of the vehicle;
identifying the location information relative to a vehicle path; and
presenting the location information.

8. The method of claim 7 further comprising:
defining the vehicle path.

9. The method of claim 8, wherein the defined path is defined by gathering data about the defined path while the vehicle is traveling along the defined path.

10. The method of claim 7, wherein the path is defined by a driver selecting the path from an origination point and a destination point.

11. The method of claim 7, wherein the path is defined by the vehicle traveling along the path from an origination point to a destination point.

12. The method of claim 7, wherein the vehicle is traveling in a direction along the path when the request is received and wherein the step of identifying the location information relative to a defined path for the vehicle includes using a direction and the defined path to identify the location information.

13. The method of claim 7, wherein the vehicle is located at a point on the path when the request is received and wherein the step of identifying the location information relative to a defined path for the vehicle include using a point and the defined path to identify the location information.

14. The method of claim 7, wherein the vehicle is traveling in a direction along the path and is located at a point on the path when the request is received and wherein the step of identifying the location information relative to a defined path for the vehicle includes using a direction, a point, and the defined path to identify the location information.

15. A data processing system, in a vehicle computer system in a vehicle, comprising:
defining means for defining a path along which the vehicle is to travel; and
using means, responsive to receiving a request for a location other than a current position of the vehicle, for using the path as a filter to identify the location.

16. The data processing system of claim 15, wherein the path is used to filter information in a database located within the vehicle computing system.

17. The data processing system of claim 15, wherein the path is used to filter information in a remotely located server computer.

18. The data processing system of claim 15 further comprising:
presenting means for presenting the location in response to using the path as a filter to identify the location.

19. The data processing system of claim 18, wherein the presenting step includes displaying the location on a map.

20. The data processing system of claim 18, wherein the presenting step includes displaying the location on a map relative to the path.

21. A data processing system located in a vehicle for providing location information, the data processing system comprising:
receiving means for receiving a request for location information other than a current position of the vehicle;
identifying means for identifying the location information relative to a path for the vehicle; and
presenting means for presenting the location information.

22. The data processing system of claim 21 further comprising:
defining means for defining the path.

23. The data processing system of claim 22, wherein the path is defined by gathering data about the path while the vehicle is traveling along the path.

24. The data processing system of claim 21, wherein the path is defined by a driver selecting the path from an origination point and a destination point.

25. The data processing system of claim 21, wherein the path is defined by the vehicle traveling along the path from an origination point to a destination point.

26. The data processing system of claim 21, wherein the vehicle is traveling in a direction along the path when the request is received and wherein the step of identifying the location information relative to a defined path for the vehicle includes using a direction and the defined path to identify the location information.

27. The data processing system of claim 21, wherein the vehicle is located at a point on the path when the request is received and wherein the step of identifying the location information relative to a defined path for the vehicle include using a point and the defined path to identify the location information.

28. The data processing system of claim 21, wherein the vehicle is traveling in a direction along the path and is located at a point on the path when the request is received and wherein the step of identifying the location information relative to a defined path for the vehicle include using a direction, a point, and the defined path to identify the location information.

29. A computer program product in a computer readable medium in a vehicle computer system in a vehicle, the computer program product comprising:
first instructions for defining a path along which the vehicle is to travel; and
second instructions, responsive to receiving a request for a location other than a current position of the vehicle, for using the path as a filter to identify the location.

30. A data processing system comprising:
a bus system;
a memory connected to the bus system, wherein the memory includes a set of instructions; and
a processing unit connected to the bus system, wherein the processing unit executes the set of instructions to receive a request for location information other than a current position of the vehicle, identify the location information relative to a defined path for the vehicle, and present the location information.

31. A data processing system comprising:
a bus system;
a memory connected to the bus system, wherein the memory includes as set of instructions; and
a processing unit connected to the bus system, wherein the processing unit executes the set of instructions to define a path along which the vehicle is to travel and use the path as a filter to identify a destination location in response to receiving a request for a destination location.

32. The data processing system of claim 31, wherein the data processing system is located within a vehicle.

33. A data processing system comprising:

a bus system;

a memory connected to the bus system, wherein the memory includes as set of instructions; and a processing unit connected to the bus system, wherein the processing unit executes the set of instructions to receive a request for location information other than a position of the vehicle, identify the location information relative to a defined path for the vehicle, and present the location information.

34. The data processing system of claim 33, wherein the data processing system is located within a vehicle.

35. The data processing system of claim 33, wherein the location information is for a facility.

36. The data processing system of claim 35, wherein the facility is one of a restaurant, gasoline station, hotel, and automatic teller machine.

* * * * *